UNITED STATES PATENT OFFICE.

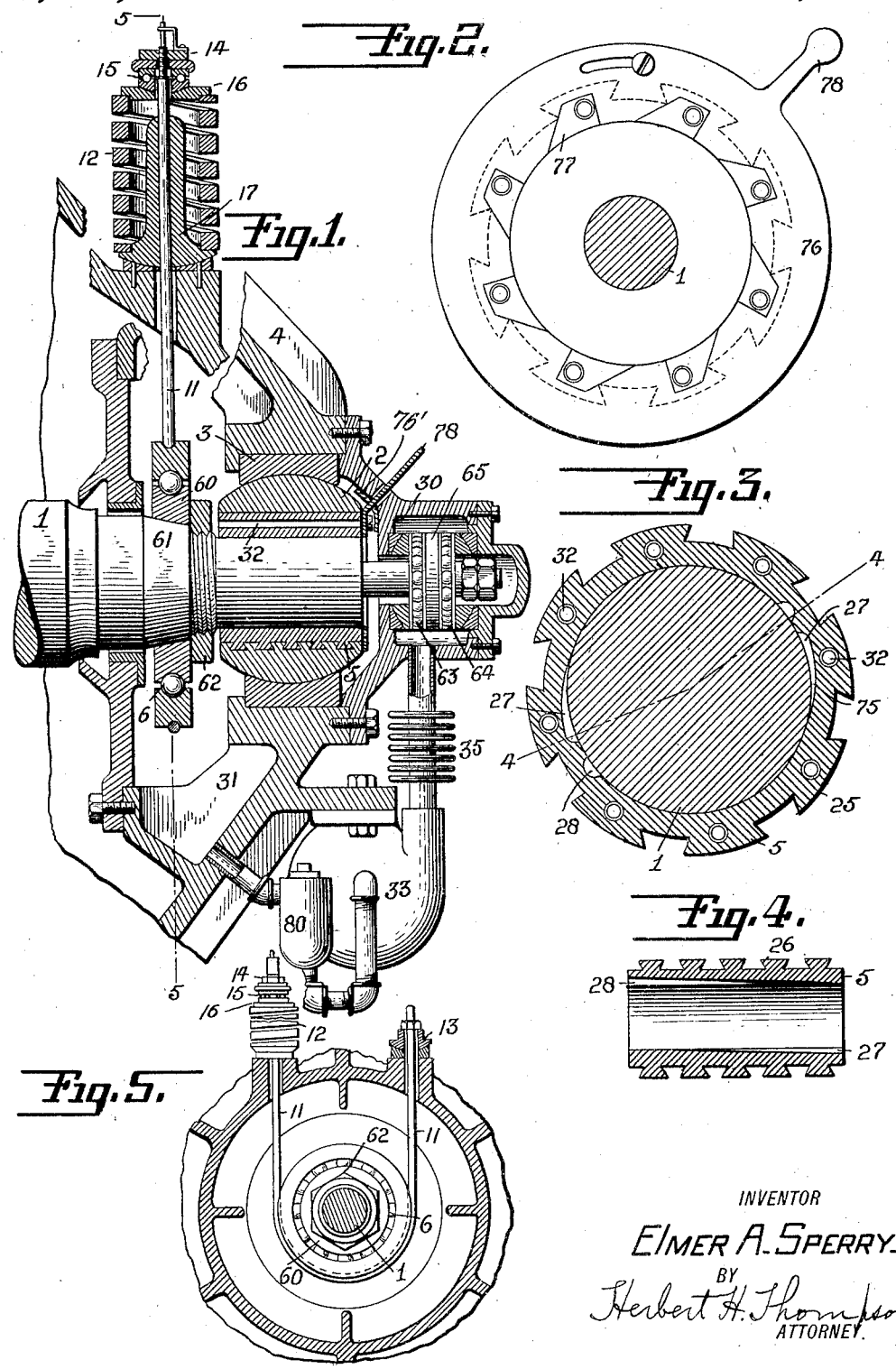

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

COOLING AND LUBRICATING SYSTEM FOR BEARINGS.

1,362,754.     Specification of Letters Patent.     Patented Dec. 21, 1920.

Original application filed December 2, 1915, Serial No. 64,616. Divided and this application filed September 14, 1917. Serial No. 191,329.

*To all whom it may concern:*

Be it known that I, ELMER A. SPERRY, a citizen of the United States of America, residing at 1505 Albemarle road, Brooklyn, in the county of Kings and State of New York, have invented certain new and useful Improvements in Cooling and Lubricating Systems for Bearings, of which the following is a specification.

This invention relates to the lubrication and cooling of bearings, more particularly to the lubrication and cooling of bearings especially adapted for rotating elements of great weight and inertia.

Referring to the drawings which illustrate what I now consider the preferred form of my invention:

Figure 1 is a fragmentary sectional elevation of one form of my improved bearing.

Fig. 2 is a detail view of certain of the parts of the bearing.

Fig. 3 is an enlarged cross section of a portion of the journal showing the babbitted part of the bearing.

Fig. 4 is a longitudinal section of the Babbitt or other lining of the bearing on the line 4—4 of Fig. 3.

Fig. 5 is a section on the line 5—5 of Fig. 1.

Referring to the drawing it will be seen that I have illustrated a shaft 1 adapted to carry a heavy rotatable member, such as a gyroscope rotor. While I have not illustrated such a rotor in this application, one may be found by referring to my copending application for stabilizing gyroscopes, Serial No. 64,616, filed December 2, 1915, of which the present application is a division. The bearing illustrated comprises what may be termed a compound bearing as it comprises two types of bearings. One of the bearings which may be termed the main bearing, comprises a ring 2 having a universal mounting in a part 3 fixed in casing 4. Ring 2 is lined with some form of anti-friction metal 5.

The second portion 6 of said bearing is preferably not fixed to casing 4, but is so supported therefrom as to support only the weight of the rotor, (not shown) or other shaft supported part, leaving the main bearing to absorb the working loads. Bearing 6 is of the anti-friction type, being shown as a ball bearing which is resiliently and universally supported from casing 4, as by a strap or cable 11 hung from the casing by means of one or more strong springs 12. Strap 11 may have one end secured to a washer or nut 13 universally mounted on casing 4, while the other end is provided with a nut 14 threaded on the end of the strap. Nut 14 bears against anti-friction washers 15, which rest on plate 16 against which spring 12 has its seat. The lower end of the spring bears against some form of bearing block 17 resting on casing 4. The tension of spring 12 may be accurately adjusted by means of nut 14 so that bearing 6 may support the full weight of the rotor, or other part, and no more.

The inner ring 60 of the bearing, forming the inner race, may be securely mounted on shaft 1 by driving or forcing it on a tapered portion 61 of said shaft. A nut 62 may be used both to force it on and hold it in place.

In addition to the two radial bearings a thrust bearing may be employed to take up the end thrust of the shaft. I prefer to construct this bearing so as to absorb the thrust in both directions, as by the two universally mounted ball bearings 63, 64 placed on opposite sides of the collar 65 on shaft 1.

On account of the heavy loads imposed on the main bearing, I prefer to provide a special oiling and cooling system therefor. The Babbitt or other anti-friction metal is firmly secured to ring 2, preferably by double dove tails 25, 26 extending at an angle to each other. The babbitt is provided with a plurality of axially extending apertures or grooves 27, 28. The apertures 27 serve to supply the bearing with oil, which is forced or flows into said apertures from right to left in Figs. 1 and 4, that is from receptacle 30 along the shaft and into receptacle 31. Grooves 27 are so designed that the oil cannot escape directly therefrom to receptacle 31 without flowing along and around shaft 1. This is preferably accomplished by making the apertures tapering inwardly as shown in Fig. 4. Another feature is that the grooves 27 have a circumferentially extending cut-away portion 75 which aids the journal in carrying the oil around with it. The other apertures 28 serve to scrape the used oil and pulverized bearing metal from the journal and to lead this material into receptacle 31. They are designed so that the oil will run therefrom into basin 31, as by tapering them oppositely to grooves 27.

The main stresses due to gyroscopic reaction are lateral so that if a gyro rotor is mounted on shaft 1, I prefer to locate apertures 27 on opposite sides of the bearing.

I also prefer to provide artificial cooling means for the bearing, such as pipes or apertures 32, which extend preferably through the babbitt, furnishing a plurality of passages for a cooling fluid. In the embodiment shown the lubricating oil is caused to flow through said passages 32 in a path substantially parallel to the stream of oil between the friction surfaces of the main bearing. In order to cause a positive circulation of the oil, a pump 33 is provided, which draws oil from the basin 31 through strainer 80 and pumps it into receptacle 30, through the thrust bearing, and through pipes 32 and the main bearing. The oil on leaving the main bearing and its ducts 32 is thrown out from the shaft 1 and member 62 by centrifugal force. The bearing 6 is thus not only lubricated by running through the oil that may collect in the bottom of chamber 31 but is splashed with oil as well. Cooling means, such as ribs 35 may be located on the pipes connecting the pump with the oil wells. Means may be provided to regulate the flow of cooling fluid through pipes 32. I have shown for this purpose an annular plate 76 (Fig. 2) provided with saw-tooth incisions 77 adapted to be brought into and out of register with the ends of pipes 32. A handle 78 extends from plate 76, without the casing 4, for manipulating the plate. A plate 76' of the same configuration as the inner surface of the casing 4, may be secured to the handle 78, as by soldering or welding, to prevent egress of the cooling and lubricating fluid through the slot in said casing through which said handle extends.

The operation of my invention is as follows: As the shaft and the mechanism it supports is being started, the entire load is taken by the anti-friction bearing, as the other forces do not arise until the shaft has attained an appreciable speed, so that no load is placed on the main bearing until it has become properly lubricated. Overheating of the main bearing is prevented by the cooling pipes 32, the extent of the cooling being regulated by plate 76. It will be seen that the compound bearing provided by me possesses the advantages of both an anti-friction bearing and an ordinary bearing without the ordinarily incident disadvantages and objections.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the general results outlined, and the invention extends to such use.

Having described my invention, what I claim and desire to secure by Letters Patent is:

1. A bearing having a cooling duct, and means for supplying lubricating fluid in parallel to said cooling duct and the friction surface of the bearing.

2. A bearing comprising a journal box lined with anti-friction metal, said lining being provided with axial cooling ducts between the outer and inner surfaces of said lining and extending completely therethrough.

3. A bearing comprising a journal box lined with anti-friction metal, said lining being provided with axial cooling ducts between the outer and inner surfaces of said lining and extending completely therethrough, and means for circulating a cooling medium through said ducts.

4. A bearing for gyroscopes comprising a journal box, cooling apertures extending through the box adjacent the journal, means for circulating a cooling medium therethrough and means for adjusting the flow of said medium.

5. A bearing for gyroscopes comprising a journal box having cooling apertures extending through the box adjacent the journal, and oil grooves extending along the surface of the bearing.

6. A bearing, having a longitudinal groove on the inner face thereof adapted to supply the journal with fresh lubricant and a second longitudinal groove similarly situated to remove the used lubricant therefrom.

7. A bearing, having a longitudinal groove on the inner face thereof adapted to supply the journal with fresh lubricant and a second longitudinal groove similarly situated to remove the used lubricant therefrom, the two grooves having their openings at opposite ends of the journal.

8. A bearing, having a longitudinal groove on the inner face thereof adapted to supply the journal with fresh lubricant and a second longitudinal groove similarly situated to remove the used lubricant therefrom, the supply groove being provided with a circumferentially extending feed slot at the journal surface.

9. A bearing, having a longitudinal groove on the inner face thereof adapted to supply the journal with fresh lubricant and a second longitudinal groove similarly situated to remove the used lubricant therefrom, the supply groove being provided with a feed slot at the journal surface which extends in the direction of rotation of the journal.

10. A bearing, having a longitudinal groove on the inner face thereof adapted to supply the journal with fresh lubricant and a second longitudinal groove similarly situated to remove the used lubricant therefrom, the two grooves having their openings at opposite ends of the journal whereby a longitudinally moving flow of oil through the journal is secured.

11. A bearing, having a plurality of inwardly tapering slots on the inner face thereof adapted to supply the journal with fresh lubricant, and a plurality of outwardly tapering slots similarly situated to remove the used lubricant therefrom.

12. A bearing, having a plurality of inwardly tapering slots on the inner face thereof adapted to supply the journal with fresh lubricant, a plurality of outwardly tapering slots similarly situated to remove the used lubricant therefrom and cooling apertures extending through the body of the bearing.

13. In combination a bearing, a supply of lubricant under pressure, a groove in the inner face of the bearing adapted to supply the journal with fresh lubricant and a second groove in said bearing face situated back of said first groove with reference to the direction of rotation of the journal, said second groove serving to remove the used lubricant from the journal.

14. In combination, a bearing having a cooling duct, said cooling duct and the friction surface of the bearing providing parallel paths for the passage of lubricating fluid and means for creating a difference in pressure between the opposite ends of said parallel paths.

15. In combination, a bearing having a cooling duct, said cooling duct and the friction surface of the bearing providing parallel paths for the passage of lubricating fluid, means for supplying lubricating fluid to said bearing and means for regulating the relative flow of lubricating fluid in said parallel paths.

16. In combination, a bearing having a cooling duct, said cooling duct and the friction surface of the bearing providing parallel paths for the passage of lubricating fluid, means for supplying lubricating fluid to said bearing and means for regulating the flow of lubricating fluid through at least one of said parallel paths.

17. In combination, a bearing, a lubricating passage from one side of said bearing to another side, a cooling duct in parallel to said lubricating passage and means for removing lubricating fluid from one side of said bearing and returning it to the other side.

18. In combination, a bearing, a lubricating passage from one side of said bearing to another side, a cooling duct in parallel to said lubricating passage, means for removing lubricating fluid from one side of said bearing and returning it to the other side, and means for purifying said lubricating fluid between its removal and return.

19. In combination, a bearing, a lubricating passage from one side of said bearing to another side, a cooling duct, in parallel to said lubricating passage, means for removing lubricating fluid from one side of said bearing and returning it to the other side and means for cooling said lubricating fluid between its removal and return.

20. In combination, a bearing, a lubricating passage from one side of said bearing to another side, a cooling duct in said bearing, a receptacle communicating with one end of said lubricating passage, a second receptacle communicating with one end of said cooling duct, said receptacles being at different levels and means for removing lubricating fluid from the lower receptacle and supplying it to the upper receptacle.

21. In combination, a shaft, a plurality of bearings therefor at least one of which is provided with cooling ducts, and means for passing lubricating fluid through one of said bearings and thence through said cooling ducts and another of said bearings.

22. In combination, a chamber, a bearing in said chamber, a second chamber, a bearing in said second chamber, a bearing between said chambers and means for causing lubricating fluid to flow from one of said chambers through said last mentioned bearing and into the other of said chambers.

23. In combination, a chamber, a bearing in said chamber, a second chamber, a bearing in said second chamber, a bearing having cooling ducts connecting said chambers and means for supplying oil to one of said chambers.

In testimony whereof I have affixed my signature.

ELMER A. SPERRY.